United States Patent [19]

Dore et al.

[11] Patent Number: 5,715,867
[45] Date of Patent: Feb. 10, 1998

[54] MECHANICALLY-CONTROLLED POWER TRANSMISSION DEVICE

[75] Inventors: Jacques Dore, Colombes; Francois Edwige, Puteaux, both of France

[73] Assignees: Automobiles Peugeot, Paris; Automobiles Citroen, Neuilly Sur Seine, both of France

[21] Appl. No.: 537,815

[22] PCT Filed: Feb. 23, 1995

[86] PCT No.: PCT/FR95/00217

§ 371 Date: Oct. 24, 1995

§ 102(e) Date: Oct. 24, 1995

[87] PCT Pub. No.: WO95/23075

PCT Pub. Date: Aug. 31, 1995

[30] Foreign Application Priority Data

Feb. 4, 1994 [FR] France ............... 94 02128

[51] Int. Cl.$^6$ .................................... F15B 13/044
[52] U.S. Cl. ..................... 137/625.65; 137/625.69
[58] Field of Search ................ 137/625.65, 625.69

[56] References Cited

U.S. PATENT DOCUMENTS 3,067,775 12/1962 Brueder .................. 137/625.69
3,095,011 6/1963 Banker .................... 137/625.69
3,807,441 4/1974 Grosseau ............. 137/625.65 X
4,784,041 11/1988 Lang .

FOREIGN PATENT DOCUMENTS 2 390 320 12/1978 France .
1 180 629 10/1964 Germany .
1 367 320 9/1974 United Kingdom .

*Primary Examiner*—Gerald A. Michalsky
*Attorney, Agent, or Firm*—Burns, Doane, Swecker & Mathis, L.L.P.

[57] ABSTRACT

Mechanically controlled power transmission device comprising a rotary engine driving, through a lever and a clevis, a hydraulic slide valve which consists, in a known manner, of a rod sliding in a hole and includes blocks capable of selectively establishing communication between firstly a user device and secondly a high pressure source or an outlet. Two springs act on the slide valve in opposite directions, return the latter, in the event of a breakdown, into a neutral position which is preferably a position in which no communication is established. The device of the invention is for use in the motor car industry.

18 Claims, 3 Drawing Sheets

MECHANICALLY-CONTROLLED POWER TRANSMISSION DEVICE

The invention concerns a mechanically-controlled power transmission device, in particular for automotive vehicle applications, such as control of braking pressure in a brake or the rapid correction of a hydropneumatic suspension.

Among the numerous present-day systems of mechanically-controlled power transmission, hydraulic systems such as hydraulic servo valves appear the best suited for incorporation into vehicles or other motorized equipment, since they are inexpensive and can be easily and quickly adapted to new technical or economic requirements.

A hydraulic servo valve can be defined as the junction between an electric or electronic device supplying a control signal, and a hydraulic device designed to provide a response as a function of this electrical signal.

The characteristics required of a servo-valve are as follows:

It must be usable for all automatic control applications, including:
  automatic pressure control, for example in a brake-control mechanism,
  automatic movement control, for example of the position of a hydraulic jack,
  automatic flow control, for example in order to make rapid correction in the hydropneumatic suspension of a vehicle.

The servo-valve must possess a high transmission band, so as to allow the rapid, stable response of the automatic control function, independently of the requisite hydraulic flow rate.

The servo valve must be compatible with the conditions governing automotive operation, by providing:
  a low cost price,
  operation within a broad temperature range,
  low level of sensitivity to impurities, thus requiring no major precautions for use and filtration of the hydraulic fluid,
  low energy consumption,
  a virtually nil hydraulic consumption under all circumstances,
  lack of sensitivity to vibrations and acceleration.

A servo valve possessing all of these features is known, this valve comprising a rotary actuating element, such as a rotary electric motor of low inertia, controlled in position and connected by mechanical linkage means to a mechanical device such as a hydraulic distributor incorporating a linear valve, this motor being equipped with a return spring biasing it in its initial position.

A device of this kind is well suited for use in a vehicle, since the rotary electric motor is insensitive to vibrations and acceleration, which have no effect on its angular position. This is not the case in a linear motor, the metallic weight of which can be shifted because of the effect of inertia. Hydraulic distributors incorporating linear valves are currently in wide-spread use, in the automotive industry, since they are inexpensive, show little sensitivity to impurities, and since, because of the very low weight of the valve, acceleration along its axis creates only very weak forces.

However, this conventionally-known device exhibits a number of problems related to the inevitable presence of clearances in the connection between the actuating element and the valve. The result is a degree of imprecision in the position of the valve and premature wear of the parts. Moreover, in the event of breakage of the mechanical linkages, the hydraulic valve may either remain in its position, which is not necessarily the position corresponding to the greatest driving safety in the event of breakdown of the hydraulic system, or it may shift uncontrollably.

To solve this problem, a return spring which acts on one end of the valve may be provided as illustrated in FIG. 1.

The electrohydraulic servo valve shown in this Figure comprises mainly a rotary electric motor (not shown) having axis A and being capable of rotating at a limited angle around a middle position, as shown by the arrow F. This motor actuates the valve 1 of a hydraulic distributor 2, for example by means of a lever 3 of which one end is connected to the axis A and whose other end supports a ball joint 4 housed in a clevis 5 attached to one end of the valve 1.

This valve comprises a rod 6 equipped with two blocks P1 and P2 which slide in the bore 7 of a sleeve 8, which is itself housed in a body or housing 9, a part 10 in the form of a plug or end block fastened to the housing 9 and ensuring the fluid-tightness of the side opposite the clevis 5.

The blocks P1 and P2 can seal or clear the holes 11 provided in the sleeve 8 and the housing 9 and opening into the bore 7, thus making it possible to establish or seal off communications between a user device U (that is, the hydraulic device being operated) and either a high-pressure source H or an exhaust E. A spring R, for example a helical spring mounted on one end of the valve 1 and interposed between the block P2 and the part 10, ensures the mechanical clearance adjustment of the linkage and pushes the valve 1 into a predetermined position in the event of breakdown of the motor or of breakage of the linkage. It can be seen in this example that this is a position in which the user device U is connected to the high-pressure source H. Of course, the user device U can be connected with the exhaust E by simple modification of the hydraulic circuit (transposition of H and E, for example).

There are cases, however, in which it is not desirable to establish a communication with the high-pressure source or with the exhaust in the event of accident.

Furthermore, in the solution described above, since the force of the spring is continuously exerted in the central position of the valve, the electric motor must supply torque to hold this position, which is, moreover, in statistical terms the most frequently-adopted position of the valve, thereby bringing about superfluous electricity consumption and heating.

In certain cases, this configuration also increases the time needed to bring the motor to its control point. FIG. 2 indicates the signal controlling the electric motor and the true position of the motor, respectively, as a function of time. The direction of the force exerted by the spring R on the position of the motor is also indicated. Beginning with a given signal, and, therefore, a given position, the control effected at time T0 moves from value 12a to value 13a, which causes the motor to move from position 12b to position 13b, the delay between points 13b and 13a being the result of the time required to establish the current in the motor and of mechanical inertia.

When, at time T1, point 14a, the passage from a positive value to a negative value 16a is desired, it is necessary to ensure a short interval at zero current 15a from time T1 to time T2, in order to avoid short-circuiting the power stages of the electronic control of the motor. During this interval the motor will be moved to point 15b because of the force exerted by the spring in a direction opposite the one desired. It will thus be moved to its reference point 16b at time T3 while exhibiting a proportionally-increased time lag in relation to time T2, which corresponds to transmission point 16a of the control signal.

Thus, the invention is intended to eliminate these problems by proposing a mechanically controlled power-transmission device comprising:

- a mechanical device such as a hydraulic valve capable of establishing or not establishing communications between at least one user device and either a high-pressure source or an exhaust;
- an actuating element or rotary motor linked to the valve by linkage means, in order to transmit to the valve a linear motion; and
- means for returning the valve to a predetermined safety position, these means comprising two springs or comparable components acting on the valve in opposite directions, this device being characterized by the fact that the springs act independently of each other.

According to other features of the device according to the invention:

- the springs are prestressed and separated from each other, so that one exerts by itself the return force when the valve moves in one direction from said safety position, and the other generates by itself the return force when the valve moves in the other direction from said position;
- the springs have the same stiffness value;
- the springs have different stiffness values;
- said predetermined safety position is not an end position of the possible course of travel of the valve, and is preferably a position in which no communication is established;
- the springs are located on either side of the valve;
- each spring is interposed between two washers capable of sliding on a rod forming an extension of the valve and arranged collinearly to it;
- the movement of each washer is limited by a stop-motion device on the rod;
- the valve comprises a rod fitted with blocks sliding in a bore provided in a sleeve in order to seal or clear holes for the establishment or elimination of said communications, and one of the stop-motion devices is formed by a circlip, and the other, by an end block belonging to the valve;
- the washer positioned on the side facing the block has dimensions sufficient to be stopped against the corresponding end face of the sleeve in which the valve slides when the block penetrates into the bore;
- in the neutral position of the valve, the sum of the clearances between the washers located facing the end blocks and the corresponding faces of the sleeve is less than or equal to the dead travel of the valve;
- the springs are positioned on the same side of the valves;
- the two springs are mounted on the same rod extending the valve on one side of the latter and arranged collinearly to this valve, each spring being interposed between two washers sliding on this rod;
- the movement of each washer is limited by a stop-motion device on the rod;
- the valve comprises a rod fitted with blocks sliding in the bore of a sleeve in order to seal or clear holes for the establishment or elimination of said connections, and the stop-motion devices are constituted, for one of the washers, by an end block belonging to the valve, and, for the others, by circlips fitted on the rod;
- the dimensions of the washers are such that, during the travel of the valve, the closest block can be stopped against the corresponding end face of the sleeve in which the valve slides, and the most distant block is stopped against a wall of a body integral with the sleeve;
- said wall has a hole in which the corresponding end of the rod can penetrate;
- in the neutral position of the valve, the sum of the clearances between said face of the sleeve and said wall and the corresponding washers is less than or equal to the dead travel of the valve.

The invention will be better understood from a reading of the following description provided solely as an example and with reference to the attached drawings, in which.

Figure 1:
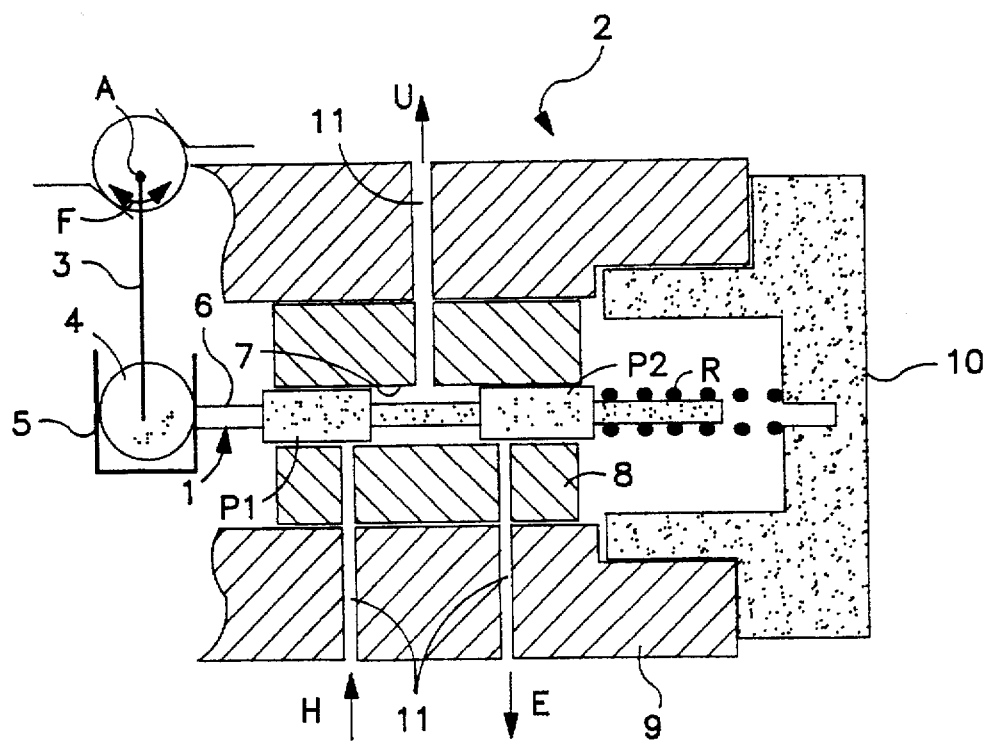
FIG. 1 is a schematic cross-section of a hydraulic servo valve actuated by a rotary motor, a return spring exerting force on one end of the valve.
Figure 3:
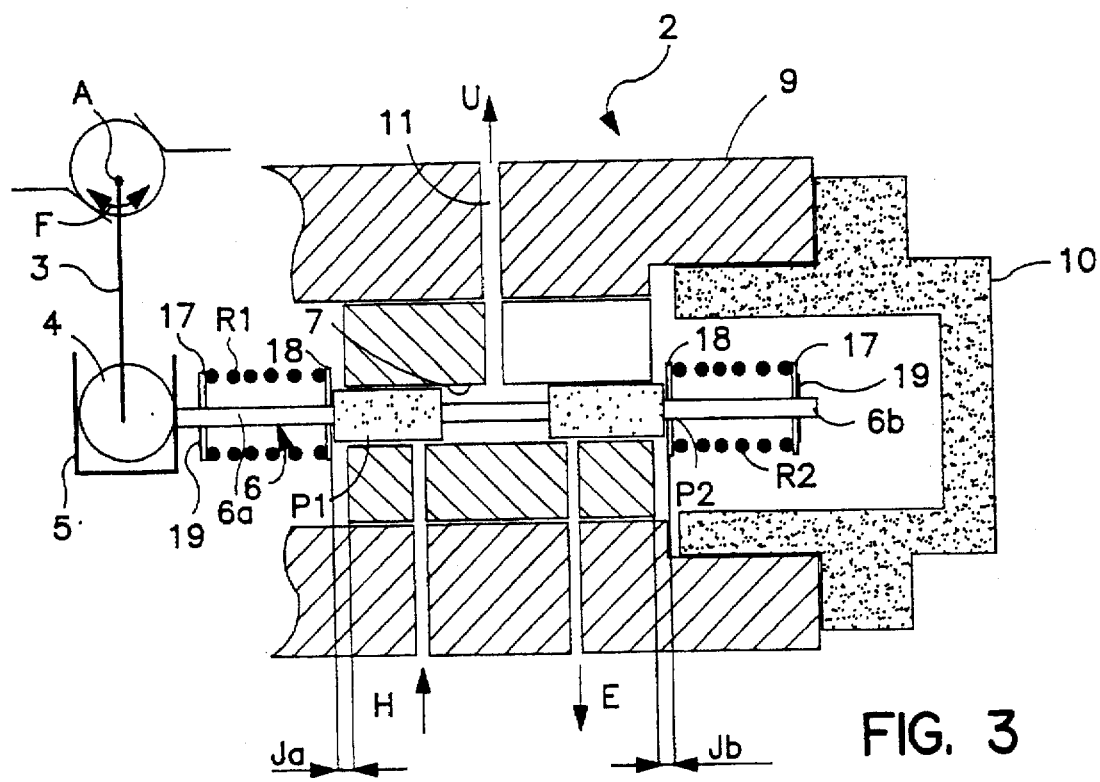
FIG. 3 is a view similar to that in FIG. 1 illustrating a device according to the invention.

FIG. 3 shows that the device according to the invention incorporates the basic features of the device illustrated in FIG. 1, incorporating the rotary motor which drives the valve 1 by means of the lever 3, the ball joint 4, and the clevis 5. This device also comprises the rod 6 supporting the blocks P1 and P2 which can seal or free the holes 11 opening into the bore 7 of the sleeve 8, as well as the body 9 and the sealing plug 10.

The main difference lies in the fact that the spring R is replaced by two springs R1 and R2 mounted on extensions 6a and 6b, respectively, of the rod 6, the first located between the clevis 5 and the block P1, and the second, beyond the block P2 on the side facing the plug 10.

Each spring is prestressed between two washers 17 and 18 which can slide on portions 6a and 6b of the rod 6 and whose movement is restricted by stop-motion devices formed by a circlips 19 in the case of washer 17 and by the corresponding end block in the case of the washer 18. In the example described here, there are only two blocks P1 and P2, but, if there had been more than two blocks, the washers 18 would still rest on the end blocks.

It will be seen again that these washers have dimensions sufficient to be stopped against the corresponding face of the sleeve 8 when the corresponding block penetrates into the bore 7 during the movements of the valve. The corresponding spring will thus be compressed and will by itself bring the valve back into the neutral position in the event of an accident, it being understood that, during normal operation, the motor functions in opposition to the springs.

The neutral position is that illustrated on FIG. 3. It can be seen that this is a substantially symmetrical position in which the blocks P1 and P2 seal the high-pressure source H and the exhaust E respectively. No communication is thus established.

It will be noted that, in the neutral position, the blocks sealing holes extend beyond each hole, in such a way that a minimal movement, called "overlap," is required before the hole in question begins to be freed and that a connection is established. This device prevents leaks in the neutral position, thereby making it possible to adjust pressure generation to the lowest possible level, and allows reduction of manufacturing costs, since the tolerances can be fairly wide.

In fact, relatively sizable variations of the overlap do not disrupt the operation of the device. The sum of the overlaps of the blocks P1 and P2 is termed the "dead travel" of the valve, and it corresponds to a distance travelled by the valve during which no communication is established.

In the device according to the invention, in the neutral position clearances Ja and Jb are provided between the washers of each spring and the corresponding end face of the sleeve 8, the sum of the clearances Ja+Jb being less than or equal to the dead travel of the valve.

When using this device, there is thus no need for torque generated by the electric motor to keep the valve in its central position, and thus no electricity consumption. In the event of cut-off of electric power to the motor, the valve will automatically return to the neutral position.

Figure 2:
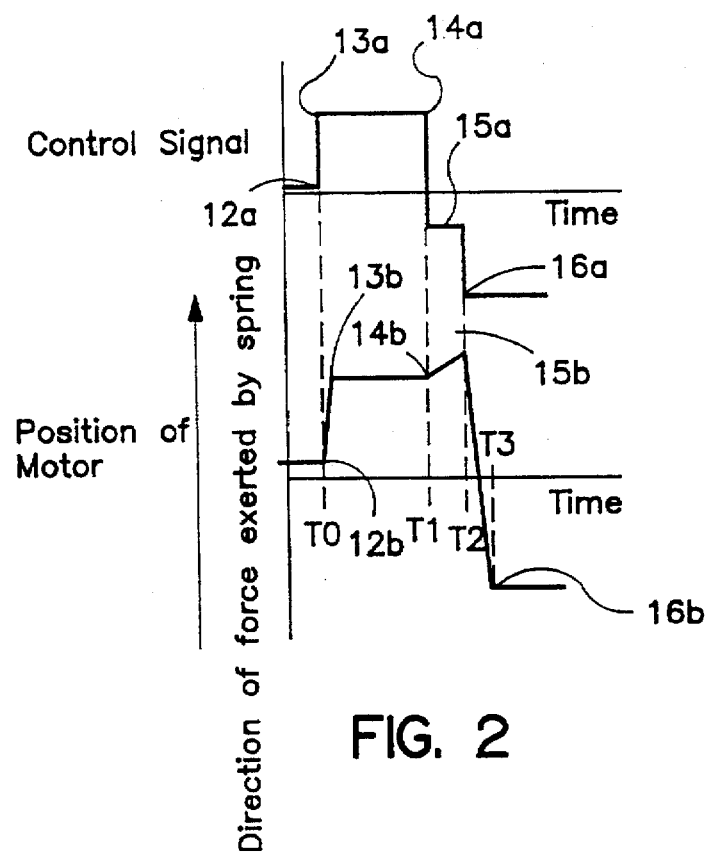
FIG. 2 is a graph showing the change of position of the motor as a function of the change in the control signal for the device in FIG. 1.
Figure 4:
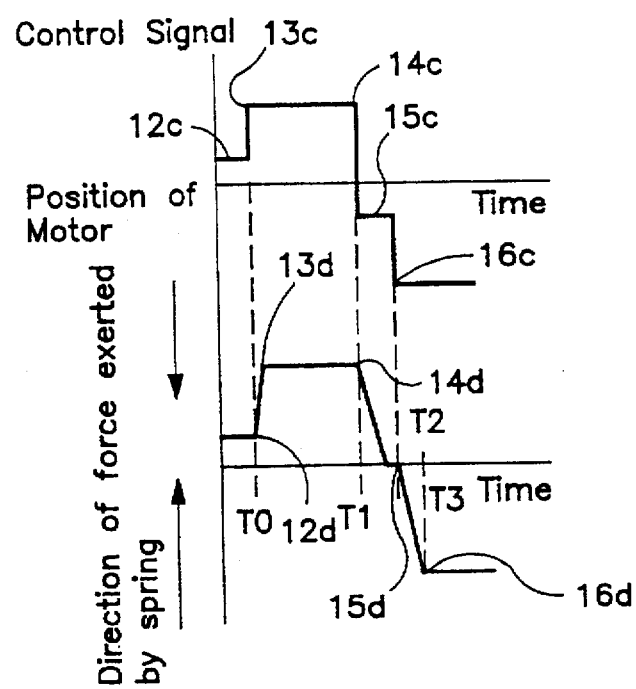
FIG. 4 is a graph similar to that in FIG. 2, but corresponding to the device in FIG. 3.

FIG. 4, which illustrates operation using the device in FIG. 3 and which uses the same references as in FIG. 2, but with the signs c and d instead of a and b, shows that, for a control signal identical to the signal in FIG. 2, the motor-positioning time is decreased in relation to the solution employing a single return spring. In fact, from time T1, points 14c and 14d, when the current in the motor is cut off, the motor is returned mechanically in the desired direction, and, consequently, point 16d is reached at time T'3, which is shorter than time T3 in FIG. 2.

Figure 5:
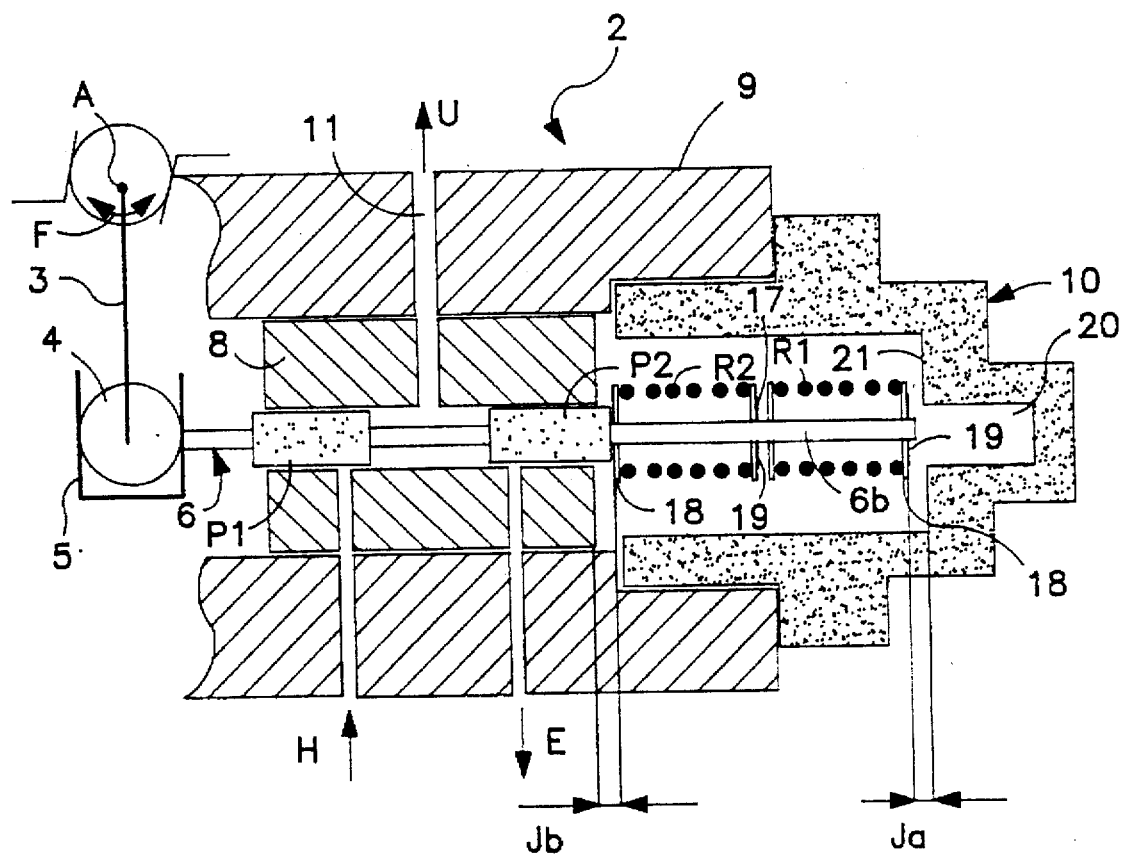
FIG. 5 is a view similar to FIG. 3 of another embodiment of the device according to the invention.

The same result can be obtained using the embodiment in FIG. 5, in which two springs are located on the same side of the valve.

If the spring R2 is positioned as shown in FIG. 3, the spring R1 is located on the same portion 6b of the rod, i.e., beyond the spring R2. The part 10 has been modified in consequence, since the portion 6b is longer, and it incorporates a recess 20 in which this portion 6b is housed when the valve travels to the right of FIG. 5. In this case, the washer 18 belonging to the spring R1 is stopped against a wall 21 of the part 10, the recess 20 being formed in this wall 21, and the spring R1 is compressed, thus producing by itself the return motion of the valve.

The position shown in FIG. 5 is also the neutral position, and the clearances Ja and Jb are encountered again, but, this time, clearance Ja exists between the washer 18 belonging to spring R1 and the wall 21 of the plug 10.

The device according to the invention has numerous advantages, since it yields the following results:

No stress is generated on the valve in the middle position, thus saving current for control of the electric motor and decreasing the heating thereof.

The return springs always exert force in the proper direction at the time of reversal of the direction of motor rotation, thus shortening the response time of the servo valve.

In positions other than the central position, the mechanical clearances are adjusted, thereby allowing effective coordination of the positions of the motor and of the valve. It should be noted that, in the middle position of the valve, the mechanical clearances (which are, moreover very slight) produce the same effects as the overlap of the valve in relation to the angular position of the motor. They have no effect on the operation of the servo-valve, since no command is transmitted within this operating range.

Moreover, since the springs are prestressed, the spring exerting the return force is actuated as soon as the valve leaves its equilibrium position (subject to clearances Ja and Jb) and, since they are separated, the operation of one is not disturbed by the other, which could be the case if they were supported on a common washer or plate.

Finally, use can be made of springs having the same stiffness or different stiffness values, thereby making it possible to select the neutral safety position as desired.

Of course, the invention is not restricted to the embodiments described and illustrated. Numerous variants can be imagined while remaining within the scope of the invention, in particular as regards the mounting of the springs and the placement or shape of the stop-motion devices.

For example, it will be seen that, in all cases, the washers 17 remain at the same place on the rod 6. Therefore, one will remain within the scope of the invention by replacing them with stationary washers or stops, even though the fact that they can slide facilitates the assembly and disassembly of the unit.

Finally, while the invention has been described with reference to a three-way distributor incorporating a valve equipped with two blocks, it is also applicable to any other type of distributor, even a much more complex one. Moreover, the invention is not usable solely in the automotive field, but also in mobile equipment and stationary machines.

We claim:

1. Mechanically-controlled power-transmission device, comprising:
    a hydraulic valve capable of establishing or not establishing communications between at least one user device and either a high-pressure source or an exhaust;
    an electrical rotary motor linked to the valve by linkage means, in order to transmit to the valve a linear motion; and
    means for returning the valve to a predetermined safety position, these means comprising two springs acting on the valve in opposite directions,
wherein the springs act independently of each other, and wherein the springs are prestressed and separated from each other in such a way that one exerts by itself the return motion when the valve travels in one direction beginning at said safety position, and the other exerts the return motion by itself when the valve travels in the other direction starting from this position.

2. Device according to claim 1, wherein the springs have the same stiffness value.

3. Device according to claim 1, wherein the springs have different stiffness values.

4. Device according to claim 1, wherein said predetermined safety position is not the end position of the possible course of travel of the valve.

5. Device according to claim 4, wherein said predetermined safety position is a position in which no communication is established.

6. Device according to claim 1, wherein the springs are located on either side of the valve.

7. Device according to claim 6, wherein each spring is interposed between two washers capable of sliding on a rod forming an extension of the valve and arranged co-linearly to the latter.

8. Device according to claim 7, wherein the movement of each washer is limited by a stop-motion device fitted on the rod.

9. Device according to claim 8, wherein the valve comprises a rod equipped with blocks sliding in a bore in a sleeve in order to seal or free holes for the establishment or elimination of said communications, and one of the stop-motion device is formed by a circlip, and the other, by an end block belonging to the valve.

10. Device according to claim 9, wherein one of the two washers is located so as to face one of said blocks, and has dimensions sufficient to be stopped against a corresponding end face of the sleeve in which the valve slides when the block penetrates into the bore.

11. Device according to claim 9, wherein the valve has a neutral position and a dead travel, the two washers are located so as to face the blocks, a clearance is defined between each of the washers and a corresponding face of the sleeve, and in the neutral position of the valve, the sum of the clearances between the washers and the corresponding faces of the sleeve is less than or equal to the dead travel of the valve.

12. Device according to claim 1, wherein the valve has a first and a second side and the springs are positioned on the first side of the valve.

13. Device according to claim 12, wherein the two springs are mounted on a single rod forming an extension of the valve on one side of the latter and arranged collinearly to this valve, each spring being interposed between two washers sliding on said rod.

14. Device according to claim 13, wherein the movement of each washer is limited by a stop-motion device on the rod.

15. Device according to claim 14, wherein, since the valve comprises a rod fitted with blocks sliding in a bore provided in a sleeve in order to seal or free holes for establishment or elimination of said communications, the stop-motion devices are formed, for one of the washers, by an end block belonging to the valve, and, for the others, by circlips provided on the rod.

16. Device according to claim 15, wherein the dimensions of the washers are such that, during travel of the valve, the closest of said blocks can be stopped against the corresponding end face of the sleeve in which the valve slides, and the most distant of said blocks is stopped against a wall of a body integral with the sleeve.

17. Device according to claim 16, wherein said wall has an opening in which the corresponding end of the rod can penetrate.

18. Device according to claim 16, wherein, in a neutral position of the valve, the sum of clearances between said face of the sleeve and said wall and the corresponding washers is less than or equal to a dead travel of the valve.

* * * * *